United States Patent Office 3,345,206
Patented Oct. 3, 1967

3,345,206
ADHESIVE COMPOSITION CONTAINING A CARBOXYL MODIFIED ELASTOMER, ADHESIVE SHEET COATED THEREWITH, AND METHOD OF MAKING THE ADHESIVE SHEET
Ralf Korpman, East Brunswick, N.J., assignor to Johnson & Johnson, a corporation of New Jersey
No Drawing. Filed July 22, 1963, Ser. No. 296,457
19 Claims. (Cl. 117—122)

The present invention relates to normally tacky and pressure-sensitive adhesive sheets and improved methods of making adhesive sheets. More particularly, the invention relates to "cured" pressure-sensitive adhesive sheets.

The use of heat-curing adhesive compositions as the coating on pressure-sensitive adhesive sheets is well known, and examples of this class of adhesive compositions are disclosed in U.S. Patents 2,963,387 and 2,999,769. These compositions, usually comprising an elastomer, a tackifier, and a curing resin, are valuable because the elastomer molecules can be crosslinked so as to give the adhesive improved solvent and oil resistance, aging stability, and high temperature performance, while retaining its properties of tackiness and pressure-sensitive adhesion.

When using prior art adhesives, this crosslinking is accomplished by heating the adhesive at a high temperature (i.e. 350–400° F.). When the optimum degree of crosslinking is reached, the composition is said to be a "cured" pressure-sensitive adhesive. This condition exists when the adhesive composition first becomes insoluble in toluene.

The standard procedure for heat curing an adhesive composition is to apply it to a backing and heat the coated sheet until the desired properties are obtained. However, many backing materials cannot withstand the temperatures required to cure prior art adhesives after they are applied to the backing. Useable sheet backing materials which cannot withstand these temperatures are cellophane, cellulose acetate, polyesters, polyolefins, polyvinyl chlorides, and the like. When adhesives which have been coated on these backings are cured, the oven temperature must be kept well under 350° F. to prevent charring, discoloration, and weakening of the backing. If the curing temperature is lowered and the curing time is lengthened so as to allow complete curing at a temperature nondestructible to the backing, the cost of production increases to the extent that commercial use is not feasible.

On alternate but little used method of heat curing prior art adhesives is to heat the adhesive during the mixing procedure, prior to the application of the adhesive to the backing material. When this method is used, serious problems have been encountered because of the difficulty in controlling the degree and uniformity of cure of a large volume of adhesive. The resulting adhesive masses often have a cure insufficient to give the adhesive coating the properties of high heat and oil resistance and aging stability, or on the other hand, have been cured to the extent that they are too insoluble for coating.

It is an object of this invention to provide an adhesive composition which, after coating on a temperature-sensitive backing, can be cured below the temperature at which these backings will be detrimentally affected. It is a further object of this invention to reduce the cost of production of adhesive sheets by providing an adhesive coating which can be cured at lower oven temperatures or at higher speeds.

It has been discovered that these objects can be obtained by the use of an adhesive composition comprising a carboxyl modified elastomer, a tackifier, and an oil soluble and heat reactive aldehyde curing resin.

The carboxyl modified elastomeric component provides the system with cohesion and elastic properties. Almost any rubbery carboxylated diene elastomer is useful in this invention, although the preferred embodiment requires a carboxylated elastomer which contains from one to three percent carboxyl groups by weight. This preferred range includes elastomers that are sufficiently carboxylated to permit the use of low curing temperatures and short curing times, and yet not carboxylated to the extent that substantial self-curing (i.e. crosslinking of the elastomer when isolated) occurs. The latter requirement is necessary so that the adhesive composition can be dissolved in conventional solvents and coated without gelling or lumps. The degree of carboxylation is also limited by the amount of milling required to prepare the elastomer for solution and the ease of dissolution of the elastomer, since these properties are to some extent dependent on the degree of carboxylation.

Among the elastomers that are useful in their carboxylated form in the adhesive compositions of this invention are natural rubber, such as wild rubber and crepe rubber; synthetic rubbers, such as styrene butadiene copolymers (Buna-S), and butadiene acrylonitrile copolymers (Buna-N); neoprene rubbers; and butyl rubbers. A preferred embodiment of carboxylated Buna-N rubber is "Hycar 1072," a medium high molecular weight acrylonitrile copolymer containing carboxyl groups on the polymer chain (30 parts acrylonitrile to 70 parts butadiene; 2.5% carboxyl groups by weight; specific gravity 1.0; Mooney viscosity 50–75) sold by B. F. Goodrich; and a preferred embodiment of carboxylated Buna-S rubber is "Unden 102524–56," a styrene butadiene copolymer (75 parts butadiene to 25 parts styrene; 1% carboxyl groups by weight; Mooney viscosity 84) made by Naugatuk Chemical Company.

Any conventional solid or liquid pressure-sensitive adhesive tackifier can be used to increase the tackiness and adhesive qualities of the adhesive compositions herein described. Such suitable resins include "Schenectady 103," an alkyl phenolic resin (specific gravity 1.05–1.15; capillary M.P. 144–162° C.; soluble in aromatic hydrocarbons, aliphatic hydrocarbons, alcohols, and ketones) made by Schenectady Varnish Company; "Paraplex G-50," an intermediate molecular weight polyester of propylene glycol adipate modified with high molecular weight fatty acids (molecular weight 2,200; specific gravity 1.08 (25° C./15° C.) viscosity 23 poises at 25° C.; refractive index 1.466 ($N_D^{25°\ C.}$); acid number 1.4; saponification number 500 (mg. KOH/g.); soluble in esters, ketones, aromatic hydrocarbons, and chlorinated hydrocarbons) sold by Rohm and Haas; "Santolite M.S.," a medium soft paratoluenesulfonamide-formaldehyde resin which is a viscous liquid above 50° C., normally sold as an 80% solution in normal butyl acetate (specific gravity 1.256) by Monsanto Chemical Company; "Santolite M.H.P.," a medium hard paratoluenesulfonamide-formaldehyde resin (density 1.35; refractive index 1.4280, 25 grams in 75 grams n-butylacetate at 25° C.; softening point 60–70° C.; soluble in alcohols, ethers, esters, ketones, and aromatic hydrocarbons) sold by Monsanto Chemical Company; "Amberol ST 137 X," a non-heat hardening octyl phenol-formaldehyde resin (M.P. 80–90° C. by the ball and ring method) sold by Rohm and Haas; and "Piccolyte S-40," a beta pinene polymer resin (M.P. 40° C. by the ball and ring method) sold by Harwick Standard Chemical Company.

The amount of tackifier used will vary with the particular carboxylated elastomer used and with the properties desired in the finished cured adhesive sheets. This amount would range from about 50 to about 500 parts by dry weight of tackifier for every 100 parts by dry weight of elastomers, and preferably from about 50 to about 200 parts by weight of liquid tackifier and/or from about 50 to about 100 parts by dry weight of solid tackifier for every 100 parts by dry weight of elastomer.

Any oil soluble and heat reactive aldehyde curing resin can be utilized in the adhesive composition of this invention, including classes of aldehydes such as melamine-formaldehyde resins, urea-formaldehyde resins, and alkyl phenol-formaldehyde resins. The nitrogen containing aldehyde resins normally are modified by reacting with an aliphatic or aromatic alcohol group. A typical example of a melamine-formaldehyde resin would be "Resimene 882," a butylated melamine-formaldehyde resin sold by Monsanto Chemical Company; a typical example of a urea-formaldehyde resin would be "UF 200E," a butylated urea-formaldehyde resin sold by Rohm and Haas; and a typical example of a phenol-formaldehyde resin would be "Amberol ST 137," an octyl phenol-formaldehyde resin sold by Rohm and Haas.

The amount of curing resin that could be used would range from about 2 to about 100 parts by dry weight for every 100 parts by dry weight of elastomer. Examples of preferred composition ranges on the basis of 100 parts by dry weight of elastomer would be: from about 2 to about 15 parts by dry weight for melamine-formaldehyde resin or urea-formaldehyde resin; and from about 15 to about 50 parts by dry weight for phenol-formaldehyde resin.

Other standard components of adhesives may be added to the compositions heretofore described. For example, any non-reactive filler such as carbon black, titanium dioxide, and clay may be used. Fillers such as zinc oxide, which reacts with carboxyl groups, should be avoided. Any standard anti-oxidant, such as tri-nonylated phenyl phosphites, or mixtures thereof may be used. Lanolin, naphthenic oils, or other conventional adhesive modifiers may also be used.

The adhesive compositions described herein may be coated on any conventional backing by any of the conventional methods and may be cured, either before or after the coating operation.

If a normally tacky and pressure-sensitive adhesive composition of the type described in this specification is coated on at least one surface of a backing and heated in an oven at 320° F., the desired degree of cure can be reached in less than 2 minutes, and many adhesive compositions of the type indicated can be cured at temperatures of less than 250° F. in less than 2 minutes. Adhesives cured in this way have excellent adhesive properties and the backings on which they have been applied do not indicate any charring, discoloration, or weakening.

On the other hand, adhesive compositions used in the prior art require temperatures in excess of 350° F. in order to obtain a cure in a normal 2 minute production curing period. Temperatures in this range are highly injurious to any of the temperature-sensitive backings previously mentioned. In order to obtain curing of prior art adhesives at the temperatures utilized by this invention, curing times of greater than 30 minutes are required, a period highly unsatisfactory for a commercially competitive product.

The invention will be further illustrated in greater detail by the following examples. It should be understood that although these examples may describe some of the more specific features of the invention, they are given only for the purpose of illustration and the invention should not be construed as limited thereto.

*Example I*

A normally tacky and pressure-sensitive adhesive composition consisting of 100 parts by dry weight of a carboxylated butadiene acrylonitrile copolymer (HYCAR 1072—B. F. Goodrich) containing 2.5% carboxyl groups by weight; 2.5 parts by dry weight of butylated melamine-formaldehyde curing resin (Resimene 882—Monsanto Chemical Company); 70 parts by dry weight of an alkyl phenolic tackifier resin (Schenectady 103—Schenectady Varnish Company); and 50 parts by dry weight of an intermediate molecular weight propylene glycol adipate polyester tackifier (Paraplex G–50—Rohm and Haas) is prepared at 20% solids in a 50/50 by volume methyl ethyl ketone-toluene solution and knife coated at a dry coating weight of 1.5 ounces per square yard on a one mil thick flexible polyester backing. The adhesive is then air-dried for fifteen minutes, followed by heating at 250° F. The adhesive is cured in about 1 minute without any injurious effect on the backing, and the resulting coated backing is useful as a good pressure-sensitive adhesive sheet.

*Example II*

A normally tacky and pressure-sensitive adhesive composition consisting of 100 parts by dry weight of a butadiene acrylonitrile copolymer (HYCAR 1022—B. F. Goodrich); 2.5 parts by dry weight of butylated melamine-formaldehyde curing resin (Resimene 882—Monsanto Chemical Company); 70 parts by dry weight of an alkyl phenolic tackifier resin (Schenectady 103—Schenectady Varnish Company); and 50 parts by dry weight of an intermediate molecular weight propylene glycol adipate polyester tackifier (Paraplex G–50—Rohm and Haas) is prepared at 20% solids in a 50/50 by volume methyl ethyl ketone-toluene solution and knife coated at a dry coating weight of 1.5 ounces per square yard on a one mil thick flexible polyester backing. The adhesive backing is then air-dried for fifteen minutes, followed by heating at 250° F. The adhesive is not cured at the end of 60 minutes.

The following tables of examples illustrate the curing characteristics of various normally tacky and pressure-sensitive adhesive compositions. These examples were carried out in substantially the same manner as Examples I and II heretofore described.

Examples I through VIII (see Table I) show the effect of the use of carboxylated vs. noncarboxylated butadiene acrylonitrile copolymers on the curing of adhesive compositions containing butylated melamine-formaldehyde curing resin. Curing of the compositions containing carboxylated butadiene acrylonitrile copolymers can be completed in about 1 minute at 250° F. independent of the tackifiers used in the adhesive compositions (see Examples I, III, VI, VII, and VIII). This is a greater than sixty fold decrease in curing time over that required for the formulations containing the noncarboxylated butadiene acrylonitrile copolymer and cured at 250° F. (see Examples II and V) or a decrease of 150° F. in curing temperature over the formulation containing the noncarboxylated butadiene acrylonitrile copolymer and cured in 1 minute (see Example IV).

Example XV (see Table I) indicates that carboxylated butadiene acrylonitrile copolymer has no self-curing properties.

The adhesive sheets prepared in Example I, III, VI, VII, and VIII (see Table I) possess good pressure-sensitive adhesive properties, and no charring or weakening of the backing occurs.

Similar results are shown for butylated urea-formaldehyde curing resins in Examples IX through XII (see Table I).

Examples XIII and XIV show the effect of the use of carboxylated vs. noncarboxylated butadiene acrylonitrile copolymers on the curing of adhesive compositions containing alkyl phenol-formaldehyde curing resin and cured at 300° F. Curing of the composition containing carboxylated butadiene acrylonitrile copolymer can be completed in about 2 minutes (see Example XIII). This is more than a thirty fold decrease in curing time over that required for the composition containing the noncarboxylated butadiene acrylonitrile copolymer (see Example XIV).

Examples XVI through XIX (see Table II) illustrate the effect of the use of carboxylated vs. noncarboxylated styrene butadiene copolymers on the curing of adhesive compositions containing butylated melamine-formaldehyde curing resins or butylated urea-formaldehyde curing resins and cured at 250° F. Curing of the compositions containing the carboxylated styrene butadiene copolymer can be completed in about 1 minute with either of the curing resins used (see Examples XVI and XVIII). This is a greater than sixty-fold decrease in curing time over that required for the formulations using the noncarboxylated styrene butadiene copolymer (see Examples XVII and XIX).

The adhesive sheets prepared in Examples XVI and XVIII (see Table II) have excellent pressure-sensitive adhesive properties, and no charring or weakening of the backing occurs.

Example XXII indicates that 1% carboxyl groups by weight carboxylated polyisoprene has no self-curing characteristics.

The adhesive sheets prepared in Examples XXI, XXIII, and XXIV have good pressure-sensitive adhesive properties, and no charring or weakening of the backing occurs.

Although several specific examples of the inventive concept have been described, the same should not be construed as limited thereby to the specific features mentioned therein but to include various other equivalent features as set forth in the claims appended hereto. It is understood that any suitable changes may be made without departing from the spirit and scope of the invention.

TABLE I

| Examples | Formulation (parts by dry weight) | | | | | | | | | | | | | | |
|---|---|---|---|---|---|---|---|---|---|---|---|---|---|---|---|
| | I | II | III | IV | V | VI | VII | VIII | IX | X | XI | XII | XIII | XIV | XV |
| Elastomers: | | | | | | | | | | | | | | | |
| Carboxylated butadiene acrylonitrile copolymer (2.5% carboxyl) (HYCAR 1072) | 100 | | 100 | | | 100 | 100 | 100 | 100 | | 100 | 100 | 100 | | 100 |
| Butadiene acrylonitrile copolymer (HYCAR 1022) | | 100 | | 100 | 100 | | | | | 100 | | | | 100 | |
| Carboxylated styrene butadiene copolymer (Unden 102524-56) (1.1% carboxyl) | | | | | | | | | | | | | | | |
| Styrene butadiene copolymer (G.R.S. 1022) | | | | | | | | | | | | | | | |
| Carboxylated polyisoprene: | | | | | | | | | | | | | | | |
| 2.00% carboxyl | | | | | | | | | | | | | | | |
| 1.00% carboxyl | | | | | | | | | | | | | | | |
| 0.35% carboxyl | | | | | | | | | | | | | | | |
| Polyisoprene | | | | | | | | | | | | | | | |
| Curing Resins: | | | | | | | | | | | | | | | |
| Octyl phenol-formaldehyde resin (Amverol ST 137) | | | | | | | | | | | | | 40 | 40 | |
| Butylated melamine-formaldehyde resin (Resimene 882) | 2.5 | 2.5 | 2.5 | 2.5 | 2.5 | 2.5 | 2.5 | 2.5 | | | | | | | |
| Butylated urea-formaldehyde resin (UF 200E) | | | | | | | | | 4 | 4 | 4 | 4 | | | |
| Tackifier Resins: | | | | | | | | | | | | | | | |
| Schenectady 103 | 70 | 70 | | | | | | | 70 | 70 | | | | | |
| Paraplex G-50 | 50 | 50 | 50 | 50 | 50 | 50 | 50 | 50 | 50 | 50 | 50 | 50 | 50 | 50 | 50 |
| Santolite M.S. | | | 80 | 80 | 80 | 50 | | | | | 70 | | 70 | 70 | 70 |
| Santolite M.H.P. | | | | | | | 70 | | | | | 70 | | | |
| Amberol ST 137 X | | | | | | | | 70 | | | | | | | |
| Time to Cure (minutes) | 1 | >60 | 1 | 1 | >60 | 1 | 1 | 1 | 1 | >60 | 1 | 1 | 2 | >60 | >60 |
| Temperature (° F.) | 250 | 250 | 250 | 400 | 250 | 250 | 250 | 250 | 250 | 250 | 250 | 250 | 300 | 300 | 250 |

TABLE II

| Examples | Formulation (parts by dry weight) | | | | | | | | |
|---|---|---|---|---|---|---|---|---|---|
| | XVI | XVII | XVIII | XIX | XX | XXI | XXII | XXIII | XXIV |
| Elastomers: | | | | | | | | | |
| Carboxylated butadiene acrylonitrile copolymer (2.5% carboxyl) (HYCAR 1072) | | | | | | | | | |
| Butadiene acrylonitrile copolymer (HYCAR 1022) | | | | | | | | | |
| Carboxylated styrene butadiene copolymer (Unden 102524-56) (1.1% carboxyl) | 100 | | 100 | | | | | | |
| Styrene butadiene copolymer (G.R.S. 1022) | | 100 | | 100 | | | | | |
| Carboxylated polyisoprene: | | | | | | | | | |
| 2.00% carboxyl | | | | | | | | | 100 |
| 1.00% carboxyl | | | | | | | 100 | 100 | |
| 0.35% carboxyl | | | | | | 100 | | | |
| Polyisoprene | | | | | 100 | | | | |
| Curing Resins: | | | | | | | | | |
| Octyl phenol-formaldehyde resin (Amberol ST 137) | | | | | | | | | |
| Butylated melamine-formaldehyde resin (Resimene 882) | 2.5 | 2.5 | | | | 2.5 | 2.5 | 2.5 | 2.5 |
| Butylated urea-formaldehyde resin (UF 200E) | | | 4 | 4 | | | | | |
| Tackifier Resins: | | | | | | | | | |
| Piccolyte S-40 | 80 | 80 | 80 | 80 | 100 | 100 | 100 | 100 | 100 |
| Schenectady 103 | | | | | | | | | |
| Paraplex G-50 | | | | | | | | | |
| Santolite M.S. | | | | | | | | | |
| Santolite M.H.P. | | | | | | | | | |
| Amberol ST 137 X | | | | | | | | | |
| Time to Cure (minutes) | 1 | >60 | 1 | >60 | >60 | 10 | >60 | 5 | 1 |
| Temperature (° F.) | 250 | 250 | 250 | 250 | 250 | 250 | 250 | 250 | 250 |

Examples XX through XXIV (see Table II) illustrate the effect of the use of carboxylated vs. noncarboxylated polyisoprenes on the curing of adhesive compositions containing butylated melamine-formaldehyde curing resins and cured at 250° F. Curing of the compositions containing the carboxylated polyisoprenes (see Examples XXI, XXIII, and XXIV) can be completed in as little as 1 minute. This is a greater than sixty fold reduction in curing time over that of the composition containing uncarboxylated polyisoprene (see Example XX).

What is claimed is:

1. A normally tacky and pressure-sensitive adhesive composition comprising a carboxyl modified rubbery diene elastomer, a tackifier in an amount of from about 50 to about 500 parts by dry weight for every 100 parts by dry weight of elastomer; and an oil soluble and heat reactive aldehyde curing resin in an amount of from about 2 to about 100 parts by dry weight for every 100 parts by dry weight of elastomer said pressure sensitive adhesive composition having a curing time of no greater than about 5 minutes at a temperature of 300° F.

2. A normally tacky and pressure-sensitive adhesive composition comprising a carboxyl modified elastomer selected from the group consisting of carboxyl modified butadiene acrylonitrile copolymer, carboxyl modified styrene butadiene copolymer, and carboxyl modified polyisoprene; a tackifier in an amount of from about 50 to about 500 parts by dry weight for every 100 parts by dry weight of elastomer; and an oil soluble and heat reactive aldehyde curing resin selected from the group consisting of urea-formaldehyde resin, melamine-formaldehyde resin, and phenol-formaldehyde resin in an amount of from about 2 to about 100 parts by dry weight for every 100 parts by dry weight of elastomer said pressure sensitive adhesive composition having a curing time of no greater than about 5 minutes at a temperature of 300° F.

3. A normally tacky and pressure-sensitive adhesive sheet comprising a backing and a normally tacky and pressure-sensitive adhesive coating on at least one surface of said backing; said pressure-sensitive adhesive coating comprising a carboxyl modified elastomer selected from the group consisting of carboxyl modified butadiene acrylonitrile copolymer, carboxyl modified styrene butadiene copolymer, and carboxyl modified isoprene; a tackifier in an amount of from about 50 to about 500 parts by dry weight for every 100 parts by dry weight of elastomer; and an oil soluble and heat reactive aldehyde curing resin selected from the group consisting of melamine-formaldehyde resin, urea-formaldehyde resin, and phenol-formaldehyde resin in an amount of from about 2 to about 100 parts by dry weight for every 100 parts by dry weight of elastomer; said pressure-sensitive adhesive coating having a curing time of no greater than about 5 minutes at a temperature of 300° F.

4. A pressure-sensitive adhesive sheet of claim 3, in which said carboxyl modified elastomer is a carboxyl modified butadiene acrylonitrile copolymer.

5. A pressure-sensitive adhesive sheet of claim 3 in which said carboxyl modified elastomer is a carboxyl modified styrene butadiene copolymer.

6. A pressure-sensitive adhesive sheet of claim 3 in which said carboxyl modified elastomer is a carboxyl modified polyisoprene.

7. A pressure-sensitive adhesive sheet of claim 4 in which said oil soluble and heat reactive aldehyde curing resin is an oil soluble and heat reactive melamine-formaldehyde curing resin, and in which said resin is present in an amount of from about 2 to about 25 parts by dry weight for every 100 parts by dry weight of elastomer.

8. A pressure-sensitive adhesive sheet of claim 4 in which said oil soluble and heat reactive aldehyde curing resin is an oil soluble and heat reactive urea-formaldehyde curing resin, and in which said resin is present in an amount of from about 2 to about 25 parts by dry weight for every 100 parts by dry weight of elastomer.

9. A pressure-sensitive adhesive sheet of claim 4 in which said oil soluble and heat reactive aldehyde curing resin is an oil soluble and heat reactive phenol-formaldehyde curing resin, and in which said resin is present in an amount of from about 10 to about 100 parts by dry weight for every 100 parts by dry weight of elastomer.

10. A pressure-sensitive adhesive sheet of claim 5 in which said oil soluble and heat reactive aldehyde curing resin is an oil soluble and heat reactive melamine-formaldehyde curing resin, and in which said resin is present in an amount of from about 2 to about 25 parts by dry weight for every 100 parts by dry weight of elastomer.

11. A pressure-sensitive adhesive sheet of claim 5 in which said oil soluble and heat reactive aldehyde curing resin is an oil soluble and heat reactive urea-formaldehyde curing resin, and in which said resin is present in an amount of from about 2 to about 25 parts by dry weight for every 100 parts by dry weight of elastomer.

12. A pressure-sensitive adhesive sheet of claim 5 in which said oil soluble and heat reactive aldehyde curing resin is an oil soluble and heat reactive urea-formaldehyde curing resin, and in which said resin is present in an amount of from about 10 to about 100 parts by dry weight for every 100 parts by dry weight of elastomer.

13. A pressure-sensitive adhesive sheet of claim 6 in which said oil soluble and heat reactive aldehyde curing resin is an oil soluble and heat reactive melamine-formaldehyde curing resin, and in which said resin is present in an amount of from about 2 to about 25 parts by dry weight for every 100 parts by dry weight of elastomer.

14. A pressure-sensitive adhesive sheet of claim 6 in which said oil soluble and heat reactive aldehyde curing resin is an oil soluble and heat reactvie urea-formaldehyde curing resin, and in which said resin is present in an amount of from about 2 to about 25 parts by dry weight for every 100 parts by dry weight of elastomer.

15. A pressure-sensitive adhesive sheet of claim 6 in which said oil soluble and heat reactive aldehyde curing resin is an oil soluble and heat reactive phenol-formaldehyde curing resin, and in which said resin is present in an amount of from about 10 to about 100 parts by dry weight for every 100 parts by dry weight of elastomer.

16. A normally tacky and pressure-sensitive cured adhesive sheet comprising a backing having cured on at least one surface thereof a normally tacky and pressure-sensitive adhesive composition comprising the reaction product of a carboxyl modified rubbery diene elastomer, a tackifier in an amount of from about 50 to about 500 parts by dry weight for every 100 parts by dry weight of elastomer, and an oil soluble and heat reactive aldehyde curing resin in an amount of from about 2 to about 100 parts by dry weight for every 100 parts by dry weight of elastomer said pressure sensitive adhesive coating having been cured for no greater than about 5 minutes at a temperature of no more than 300° F.

17. A normally tacky and pressure-sensitive cured adhesive sheet comprising a thermoplastic backing having cured on at least one surface thereof a normally tacky and pressure-sensitive adhesive composition comprising the reaction product of a carboxyl modified elastomer selected from the group consisting of carboxyl modified butadiene acryonitrile copolymer, carboxyl modified styrene butadiene copolymer, and carboxyl modified polyisoprene; a tackifier in an amount of from about 50 to about 500 parts by dry weight for every 100 parts by dry weight of elastomer; and an oil soluble and heat reactive aldehyde curing resin selected from the group consisting of urea-formaldehyde resin, melamine-formaldehyde resin, and phenol-formaldehyde resin in an amount of from about 2 to about 100 parts by dry weight for every 100 parts by dry weight of elastomer; said pressure-sensitive adhesive coating having been cured on said backing in no greater than about 5 minutes at a temperature of no greater than 300° F.

18. A method of making a cured, normally tacky and pressure-sensitive adhesive sheet comprising coating at least one surface of a backing with a normally tacky and pressure-sensitive adhesive composition comprising a carboxyl modified rubbery diene elastomer; a tackifier in an amount of from about 50 to about 500 parts by dry weight for every 100 parts by dry weight of elastomer; and an oil soluble and heat reactive aldehyde curing resin in an amount of from about 2 to about 100 parts by dry weight for every 100 parts by dry weight of elastomer, and curing said composition in no greater than about 5 minutes at a temperature of no greater than 300° F.

19. The method of claim 18 in which said carboxyl modified elastomer is selected from the group consisting of carboxyl modified butadiene acrylonitrile copolymer, carboxyl modified styrene butadiene copolymer, and carboxyl modified polyisoprene; and in which said oil soluble and heat reactive aldehyde curing resin is selected from the group consisting of melamine-formaldehyde curing resin and urea-formaldehyde curing resin; and in which said oil soluble and heat reactive aldehyde curing resin is present in amounts of from about 2 to about 25 parts by dry weight for every 100 parts by dry weight of elastomer; and in which said adhesive composition is cured at a temperature of no greater than 250° F.

References Cited

UNITED STATES PATENTS

| | | | |
|---|---|---|---|
| 2,605,248 | 7/1952 | Fisk | 260—43 |
| 2,708,192 | 5/1955 | Joesting | 117—122 |
| 2,871,213 | 1/1959 | Graulich et al. | 260—29.3 |
| 2,931,742 | 4/1960 | Hicks | 117—161 |
| 2,999,769 | 9/1961 | Korpman | 117—122 |
| 3,060,061 | 10/1962 | Loebler et al. | 117—139.4 |
| 3,067,057 | 12/1962 | Dabroski | 117—68.5 |
| 3,068,117 | 12/1962 | Korpman | 117—76 |
| 3,100,160 | 8/1963 | Korpman | 117—122 |
| 3,231,419 | 1/1966 | Korpman | 117—122 |
| 3,242,110 | 3/1966 | Korpman | 260—5 |

OTHER REFERENCES

Morton, Maurice, "Introduction to Rubber Technology" (1959), pp. 295–296.

WILLIAM D. MARTIN, *Primary Examiner.*

W. D. HERRICK, *Assistant Examiner.*

UNITED STATES PATENT OFFICE
CERTIFICATE OF CORRECTION

Patent No. 3,345,206                        October 3, 1967

Ralf Korpman

It is hereby certified that error appears in the above numbered patent requiring correction and that the said Letters Patent should read as corrected below.

Column 1, line 48, for "On" read -- An --; columns 5 and 6, TABLE I, last column, line 14 thereof, for "70" read -- 80 --; same columns, TABLE II, third column, line 11 thereof, strike out "4"; same table, under column heading XIX, line 11 thereof, insert -- 4 --.

Signed and sealed this 12th day of November 1968.

(SEAL)
Attest:

Edward M. Fletcher, Jr.
Attesting Officer

EDWARD J. BRENNER
Commissioner of Patents